(12) United States Patent
Ushida et al.

(10) Patent No.: US 11,039,384 B2
(45) Date of Patent: Jun. 15, 2021

(54) WIRELESS COMMUNICATION SYSTEM, INFORMATION ACQUIRING TERMINAL, COMPUTER PROGRAM, METHOD FOR DETERMINING WHETHER TO ADOPT PROVIDED INFORMATION

(71) Applicant: Sumitomo Electric Industries, Ltd., Osaka (JP)

(72) Inventors: Katsunori Ushida, Osaka (JP); Koichi Takayama, Osaka (JP); Yasuhiko Nishi, Osaka (JP); Susumu Takeshima, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 278 days.

(21) Appl. No.: 16/318,903

(22) PCT Filed: Jul. 19, 2017

(86) PCT No.: PCT/JP2017/026126
§ 371 (c)(1),
(2) Date: Jan. 18, 2019

(87) PCT Pub. No.: WO2018/021116
PCT Pub. Date: Feb. 1, 2018

(65) Prior Publication Data
US 2019/0239155 A1    Aug. 1, 2019

(30) Foreign Application Priority Data

Jul. 27, 2016    (JP) .............................. JP2016-147813

(51) Int. Cl.
*H04W 48/18* (2009.01)
*G08G 1/01* (2006.01)
(Continued)

(52) U.S. Cl.
CPC .............. *H04W 48/18* (2013.01); *G08G 1/01* (2013.01); *G08G 1/09* (2013.01); *G08G 1/13* (2013.01); *H04W 4/50* (2018.02); *H04W 92/18* (2013.01)

(58) Field of Classification Search
None
See application file for complete search history.

(56) References Cited

U.S. PATENT DOCUMENTS

2013/0329548 A1    12/2013 Nakil et al.
2017/0142591 A1*   5/2017 Vrzic .................. H04L 47/2408
(Continued)

FOREIGN PATENT DOCUMENTS

| CN | 102855766 A | 1/2013 |
| JP | 2005-176066 A | 6/2005 |

(Continued)

*Primary Examiner* — Hassan A Phillips
*Assistant Examiner* — Gautam Sharma
(74) *Attorney, Agent, or Firm* — Baker Botts L.L.P.; Michael A. Sartori

(57) ABSTRACT

A wireless communication system according to one mode of the present invention includes: an information providing terminal being a communication terminal belonging to a first node below, the information providing terminal configured to transmit, to another station, first provision information that includes source data usable for driving support control; a base station belonging to a second node below and configured to transmit, to another station, second provision information based on the source data; a server belonging to a third node below and configured to transmit, to another station, third provision information based on the source data; an information acquiring terminal being a communication terminal belonging to the first node below, the information acquiring terminal being mounted to a target vehicle to which the first to third provision information is to be provided; and a determination unit configured to determine (Continued)

whether or not adoption of the first to third provision information is allowed, on the basis of a position of the target vehicle and a position associated with the source data.

First node: a communication node configured to perform terminal-to-terminal communication in a first network slice.

Second node: a communication node configured to communicate with the first node in a second network slice.

Third node: a communication node configured to communicate with the first node via the second node in a third network slice.

12 Claims, 8 Drawing Sheets

(51) Int. Cl.
*G08G 1/09* (2006.01)
*G08G 1/13* (2006.01)
*H04W 4/50* (2018.01)
*H04W 92/18* (2009.01)

(56) References Cited

U.S. PATENT DOCUMENTS

| 2017/0178498 | A1* | 6/2017 | Mcerlean | G08G 1/166 |
| 2017/0295579 | A1* | 10/2017 | Sheng | H04W 64/00 |
| 2019/0168696 | A1* | 6/2019 | Lau | H04L 67/12 |
| 2019/0222979 | A1* | 7/2019 | Hahn | H04W 72/0453 |

FOREIGN PATENT DOCUMENTS

| JP | 2006-300771 A | 11/2006 |
| JP | 2009-175610 A | 8/2009 |
| JP | 2013-109746 A | 6/2013 |
| JP | 2016-099864 A | 5/2016 |
| WO | 2009/072165 A1 | 6/2009 |

* cited by examiner

WIRELESS COMMUNICATION SYSTEM, INFORMATION ACQUIRING TERMINAL, COMPUTER PROGRAM, METHOD FOR DETERMINING WHETHER TO ADOPT PROVIDED INFORMATION

TECHNICAL FIELD

The present invention relates to a wireless communication system, an information acquiring terminal, a computer program, and a method for determining whether or not adoption of provision information is allowed.

This application claims priority on Japanese Patent Application No. 2016-147813 filed on Jul. 27, 2016, the entire contents of which are incorporated herein by reference.

BACKGROUND ART

PATENT LITERATURE 1 describes, as one mode of the traffic system, a traffic system that includes: a central apparatus of a traffic control center; a plurality of roadside communication devices which communicate with the central apparatus through dedicated lines; and an on-vehicle communication device which wirelessly communicates with each roadside communication device (see paragraphs 0104 to 0129 of PATENT LITERATURE 1).

CITATION LIST

Patent Literature

PATENT LITERATURE 1: Japanese Laid-Open Patent Publication No. 2013-109746

SUMMARY OF INVENTION (1) A wireless communication system according to one mode of the present disclosure includes: an information providing terminal being a communication terminal belonging to a first node below, the information providing terminal configured to transmit, to another station, first provision information that includes source data usable for driving support control; a base station belonging to a second node below and configured to transmit, to another station, second provision information based on the source data; a server belonging to a third node below and configured to transmit, to another station, third provision information based on the source data; an information acquiring terminal being a communication terminal belonging to the first node below, the information acquiring terminal being mounted to a target vehicle to which the first to third provision information is to be provided; and a determination unit configured to determine whether or not adoption of the first to third provision information is allowed, on the basis of a position of the target vehicle and a position associated with the source data.

First node: a communication node configured to perform terminal-to-terminal communication in a first network slice.

Second node: a communication node configured to communicate with the first node in a second network slice.

Third node: a communication node configured to communicate with the first node via the second node in a third network slice.

(8) A computer program according to one mode of the present disclosure is a computer program configured to cause a computer to function as a communication node of a wireless communication system. The wireless communication system includes: an information providing terminal being a communication terminal belonging to the first node above, the information providing terminal configured to transmit, to another station, first provision information that includes source data usable for driving support control; a base station belonging to the second node above and configured to transmit, to another station, second provision information based on the source data; a server belonging to the third node above and configured to transmit, to another station, third provision information based on the source data; and an information acquiring terminal being a communication terminal belonging to the first node above, the information acquiring terminal being mounted to a target vehicle to which the first to third provision information is to be provided. The computer program causes the computer to function as a determination unit configured to determine whether or not adoption of the first to third provision information is allowed, on the basis of a position of the target vehicle and a position associated with the source data.

(9) A determination method according to one mode of the present disclosure is a method for determining whether or not adoption of provision information is allowed, the method being performed in a wireless communication system. The wireless communication system includes: an information providing terminal being a communication terminal belonging to the first node above, the information providing terminal configured to transmit, to another station, first provision information that includes source data usable for driving support control; a base station belonging to the second node above and configured to transmit, to another station, second provision information based on the source data; a server belonging to the third node above and configured to transmit, to another station, third provision information based on the source data; and an information acquiring terminal being a communication terminal belonging to the first node above, the information acquiring terminal being mounted to a target vehicle to which the first to third provision information is to be provided. The method includes a step of determining whether or not adoption of the first to third provision information is allowed, on the basis of a position of the target vehicle and a position associated with the source data.

DESCRIPTION OF EMBODIMENTS

Figure 1:
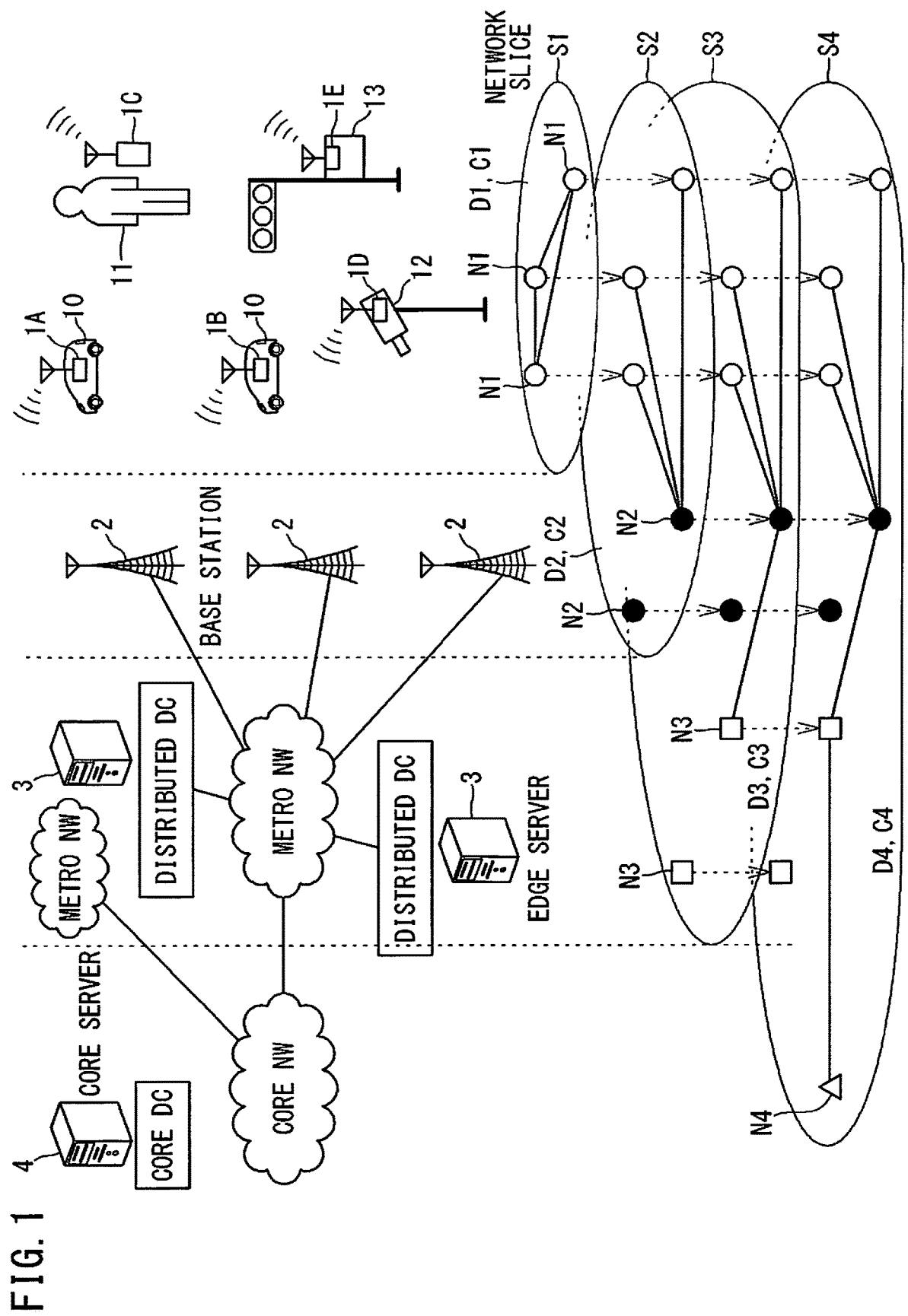
FIG. 1 is a diagram showing an overall configuration of a wireless communication system according to an embodiment of the present invention.

A traffic system that informs an occupant of a vehicle about an abnormal event that has occurred in another vehicle has already been proposed (see PATENT LITERATURE 1).

In this traffic system, a central apparatus determines whether or not behavior of each vehicle corresponds to a predetermined abnormal event, on the basis of vehicle information (travel trail) that includes the data generation time, the vehicle speed, the vehicle position, the heading direction, and the like that have been uplink-transmitted by the vehicle.

When the central apparatus has detected a predetermined abnormal event, the central apparatus downlink-transmits, to a vehicle, information indicating the content, the location, and the like of the abnormal event.

The vehicle having received this information informs the occupant of occurrence of the abnormal event. Accordingly, driving support control for coping with the abnormal travel is performed.

Problems to be Solved by the Present Disclosure

In a conventional traffic system, vehicle information is uplink-transmitted along a communication path of on-vehicle communication device→roadside communication device→central apparatus, and information regarding abnormal travel having the vehicle information as source data is downlink-transmitted along a communication path of central apparatus→roadside communication device→on-vehicle communication device.

Thus, vehicle information transmitted from the on-vehicle communication device is processed always via the central apparatus and transmitted to the on-vehicle communication device. However, a system is desired that can appropriately provide information to the target vehicle in a further flexible manner in consideration of the data volume of the vehicle information, communication delay in the transmission path, and processing delay in the central apparatus.

In view of the above conventional problem, an object of the present disclosure is to provide a wireless communication system and the like that can appropriately provide information to a target vehicle.

Effects of the Present Disclosure

According to the present disclosure, a wireless communication system and the like that can appropriately provide information to a target vehicle can be provided.

Outline of Embodiment of the Present Disclosure

Hereinafter, the outline of an embodiment of the present disclosure is listed and described.

(1) A wireless communication system of the present embodiment includes: an information providing terminal being a communication terminal belonging to a first node below, the information providing terminal configured to transmit, to another station, first provision information that includes source data usable for driving support control; a base station belonging to a second node below and configured to transmit, to another station, second provision information based on the source data; a server belonging to a third node below and configured to transmit, to another station, third provision information based on the source data; an information acquiring terminal being a communication terminal belonging to the first node below, the information acquiring terminal being mounted to a target vehicle to which the first to third provision information is to be provided; and a determination unit configured to determine whether or not adoption of the first to third provision information is allowed, on the basis of a position of the target vehicle and a position associated with the source data.

First node: a communication node configured to perform terminal-to-terminal communication in a first network slice.

Second node: a communication node configured to communicate with the first node in a second network slice.

Third node: a communication node configured to communicate with the first node via the second node in a third network slice.

According to the wireless communication system of the present embodiment, the determination unit determines whether or not adoption of the first to third provision information is allowed, on the basis of the position of the target vehicle and the position associated with the source data. Thus, among the pieces of the first to third provision information, provision information that is suitable for the target vehicle can be provided to the target vehicle. Therefore, information provision to the target vehicle can be appropriately performed.

Figure 4:
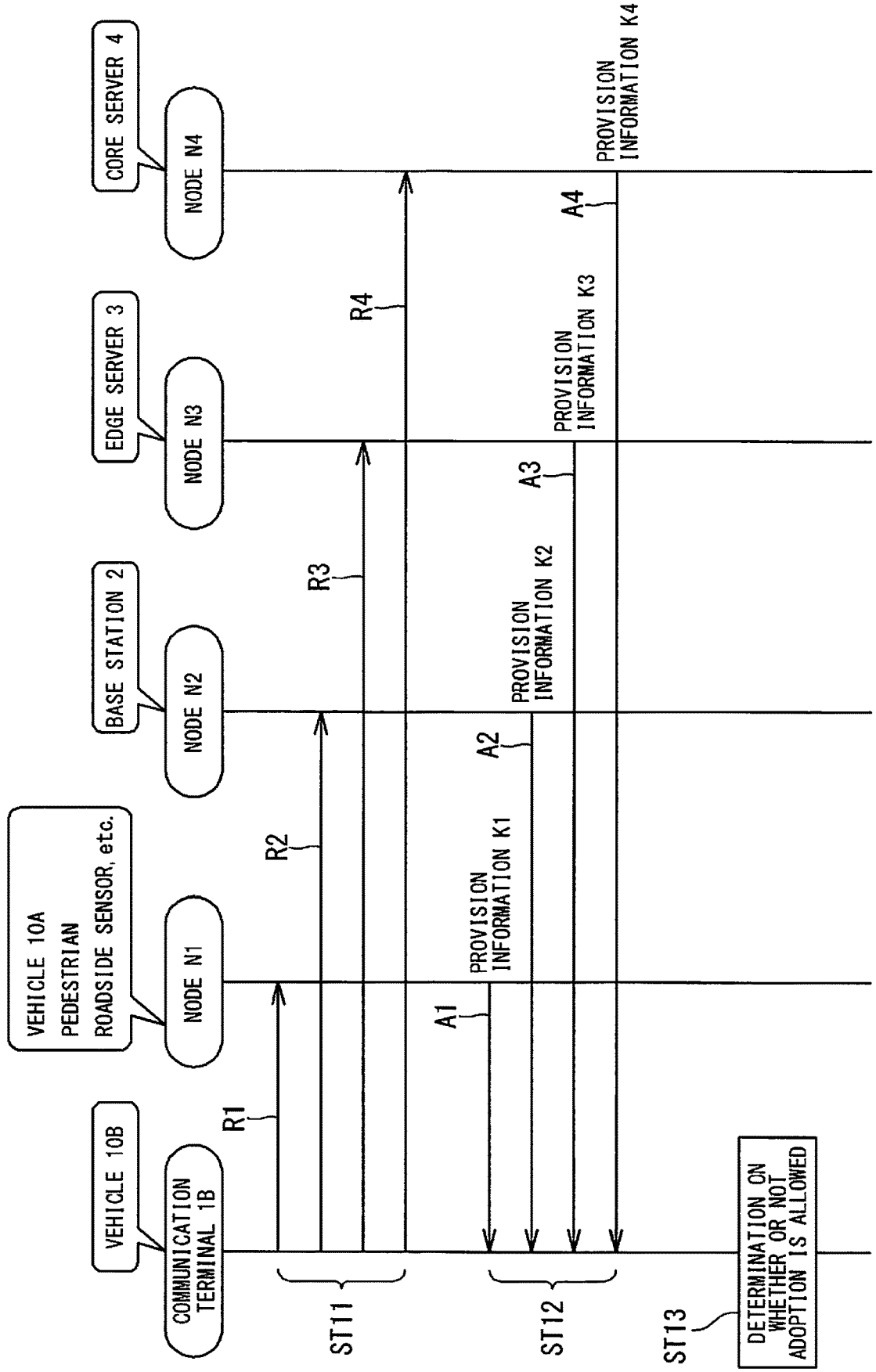
FIG. 4 is a sequence diagram showing one example of an acquisition process of provision information performed by a vehicle.

(2) In the wireless communication system of the present embodiment, preferably, the determination unit is provided to the target vehicle (for example, see FIG. 4).

In this case, the determination unit provided to the target vehicle comprehensively determines whether or not adoption of the first to third provision information is allowed. Therefore, there is no need to install a function of determining whether or not adoption of the first to third provision information is allowed, into other stations such as the base station and the server, and work cost necessary for construction of the wireless communication system can be suppressed.

Figure 5:
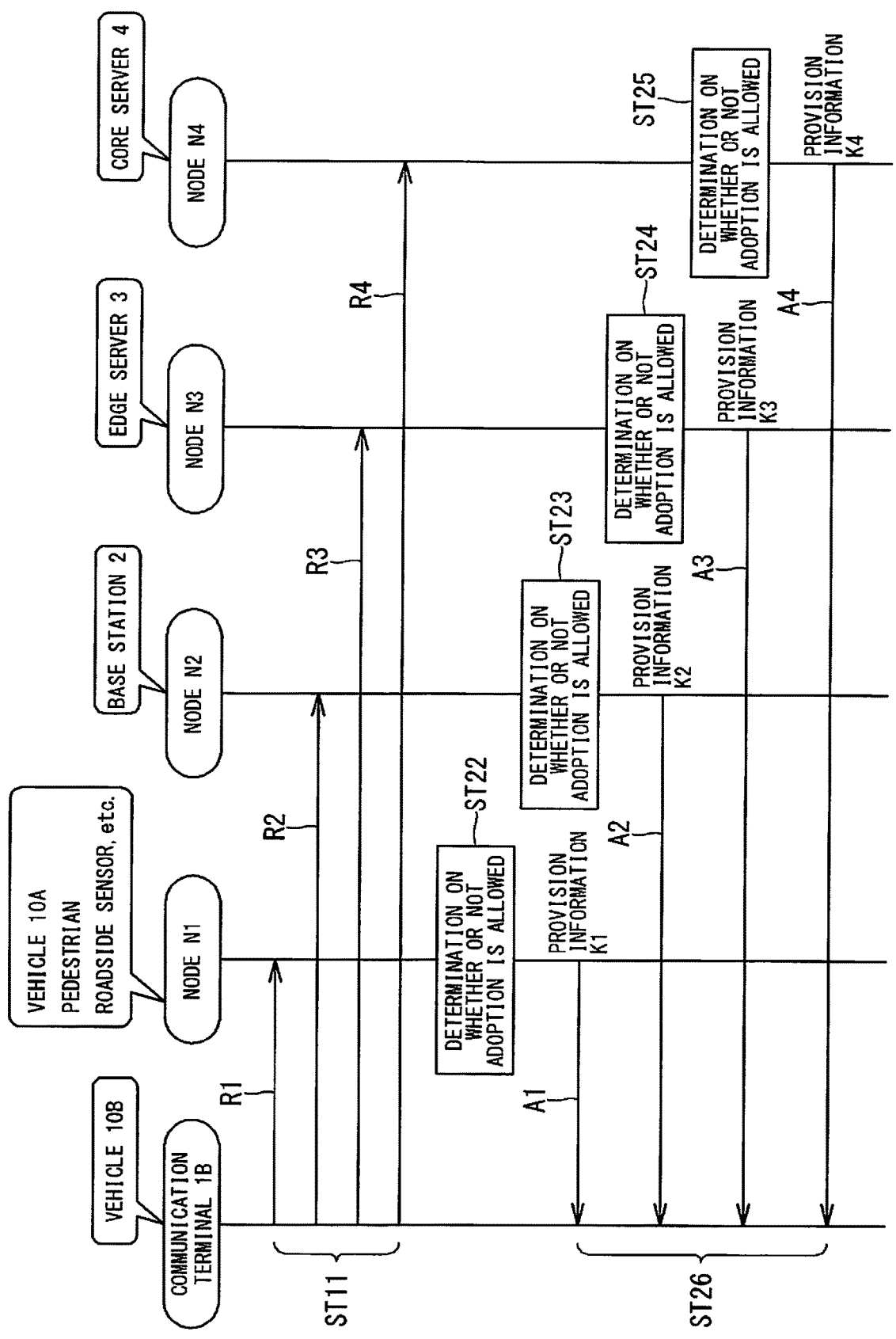
FIG. 5 is a sequence diagram showing another example of the acquisition process of provision information performed by the vehicle.

(3) In the wireless communication system of the present embodiment, the determination unit may be provided to at least one of: an apparatus having the information providing terminal; the base station; and the server (for example, see FIG. 5).

In this case, the determination unit provided to at least one of the apparatus having the information providing terminal, the base station, and the server determines whether or not adoption of the first to third provision information is allowed. Therefore, there is no need to provide the target vehicle with the determination unit which comprehensively determines whether or not adoption of the first to third provision information is allowed, and information processing capability of the target vehicle is allowed to be low.

(4) In the wireless communication system of the present embodiment, preferably, the determination unit determines whether or not adoption of the first to third provision information is allowed, on the basis of at least one of: a distance from the position of the target vehicle to the position associated with the source data; a required time period from the position of the target vehicle to the position associated with the source data; and priorities of the first to third provision information.

Accordingly, the latest provision information can be preferentially adopted, and driving support control having high real-timeness can be performed.

(5) In the wireless communication system of the present embodiment, preferably, the determination unit determines whether or not adoption of the first to third provision information is allowed, on the basis of at least one of a vehicle speed, a heading direction, and a travel route of the target vehicle.

Accordingly, since obviously unnecessary provision information, such as provision information regarding positions upstream of the target vehicle, is not adopted, it is possible to easily narrow provision information useful for the target vehicle.

(6) In the wireless communication system of the present embodiment, preferably, the determination unit determines whether or not adoption of the first to third provision information is allowed, on the basis of a data content of the source data.

Accordingly, the diffusion range of the source data from the occurrence position thereof can be adjusted as desired in accordance with the data content of the source data.

(7) In the wireless communication system of the present embodiment, a plurality of the network slices of the server may be defined. That is, the wireless communication system may further include another server belonging to a fourth node below and configured to transmit, to another station, fourth provision information based on the source data.

Fourth node: a communication node configured to communicate with the first node via the third node and the second node or via the second node in a fourth network slice.

In this case, the determination unit may determine whether or not adoption of the first to fourth provision information is allowed, on the basis of the position of the target vehicle and the position associated with the source data.

(8) An information acquiring terminal of the present embodiment relates to an information acquiring terminal included in the wireless communication system according to (1) to (7) described above.

Therefore, the information acquiring terminal of the present embodiment exhibits effects similar to those of the wireless communication system according to (1) to (7) described above.

(9) A server of the present embodiment relates to a server included in the wireless communication system according to (1) to (7) described above.

Therefore, the server of the present embodiment exhibits effects similar to those of the wireless communication system according to (1) to (7) described above.

(10) A computer program of the present embodiment relates to a computer program configured to cause a computer to function as a communication node of the wireless communication system according to (1) to (7) described above.

Therefore, the computer program of the present embodiment exhibits effects similar to those of the wireless communication system according to (1) to (7) described above.

(11) A determination method of the present embodiment relates to a method for determining whether or not adoption of provision information is allowed, the method being performed in the wireless communication system according to (1) to (7) described above.

Therefore, the determination method of the present embodiment exhibits effects similar to those of the wireless communication system according to (1) to (7) described above.

Details of Embodiment of the Present Disclosure

Hereinafter, details of an embodiment of the present disclosure will be described with reference to the drawings. It should be noted that at least some parts of the embodiment described below may be combined together as desired.

[Overall Configuration of Wireless Communication System]

FIG. 1 is a diagram showing an overall configuration of a wireless communication system according to an embodiment of the present disclosure.

As shown in FIG. 1, a wireless communication system of the present embodiment includes: a plurality of communication terminals 1A to 1E which can perform wireless communication; one or a plurality of base stations 2 which perform wireless communication with the communication terminals 1A to 1E; one or a plurality of edge servers 3 which perform wired or wireless communication with the base stations 2; and one or a plurality of core servers 4 which perform wired or wireless communication with the edge servers 3.

Each core server 4 is installed in a core data center (DC) of a core network. Each edge server 3 is installed in a distributed data center (DC) of a metro network.

The metro network is a communication network constructed for each city, for example. The metro network of each city is connected to a core network.

Each base station 2 is communicably connected to an edge server 3 of the distributed data centers included in the metro network.

The core server 4 is communicably connected to the core network. Each edge server 3 is communicably connected to the metro network. Therefore, the core server 4 is communicable with the edge servers 3 and the base stations 2 belonging to the metro network of each city, via the core network and the metro network.

Each base station 2 is composed of at least one of a macro cell base station, a micro cell base station, and a pico cell base station.

In the wireless communication system of the present embodiment, the edge server 3 and the core server 4 are each implemented as a general-purpose server capable of providing SDN (Software-Defined Networking). The base station 2 and a relay apparatus (not shown) such as a repeater are each implemented as a transport device capable of providing SDN.

Therefore, due to network virtualization technology, a plurality of virtual networks (network slices) S1 to S4 that satisfy conflicting service requirements such as low delay communication and large-volume communication can be defined in physical devices of a wireless communication system.

The aforementioned network virtualization technology is a basic concept of "the 5th-generation mobile communication system" (hereinafter, abbreviated as "5G" (5th Generation)) of which standardization is in progress at present. Therefore, the wireless communication system of the present embodiment is realized as 5G for example.

However, the wireless communication system of the present embodiment is not limited to 5G and may be any mobile communication system that can define a plurality of network slices (hereinafter, also referred to as "slices") S1 to S4 in accordance with predetermined service requirements such as delay time period. The number of layers of slices to be defined is not limited to four, and may be five or greater.

In the example shown in FIG. 1, the network slices S1 to S4 are defined as follows.

The slice S1 is a slice defined such that the communication terminals 1A to 1E directly communicate with one another. Each of the communication terminals 1A to 1E which directly communicate with one another in the slice S1 is also referred to as a "node N1".

The slice S2 is a slice defined such that the communication terminals 1A to 1E communicate with a base station 2.

The highest-order communication node in the slice S2 (the base station 2 in the shown example) is also referred to as a "node N2".

The slice S3 is a slice defined such that the communication terminals 1A to 1E communicate with an edge server 3 via the base station 2. The highest-order communication node in the slice S3 (the edge server 3 in the shown example) is also referred to as a "node N3".

In the slice S3, the node N2 serves as a relay node. That is, data communication is performed through an uplink path of the node N1→the node N2→the node N3 and a downlink path of the node N3→the node N2→the node N1.

The slice S4 is a slice defined such that the communication terminals 1A to 1E communicate with a core server 4 via the base station 2 and the edge server 3. The highest-order communication node in the slice S4 (the core server 4 in the shown example) is also referred to as a "node N4".

In the slice S4, the node N2 and the node N3 serve as relay nodes. That is, data communication is performed through an uplink path of the node N1→the node N2→the node N3→the node N4 and a downlink path of the node N4→the node N3→the node N2→the node N1.

In the slice S4, routing in which the edge server 3 is not used as a relay node may be adopted. In this case, data communication is performed through an uplink path of the node N1→the node N2→the node N4 and a downlink path of the node N4→the node N2→the node N1.

In the slice S2, when a plurality of base stations 2 (node N2) are included, routing that includes communication between base stations 2, 2 is also possible.

Similarly, in the slice S3, when a plurality of edge servers 3 (node N3) are included, routing that includes communication between edge servers 3, 3 is also possible. In the slice S4, when a plurality of core servers 4 (node N4) are included, routing that includes communication between core servers 4, 4 is also possible.

The communication terminal 1A, 1B is implemented as a wireless communication device mounted to a vehicle 10. Thus, the vehicles 10 can perform "vehicle-to-vehicle communication" through direct wireless communication in the slice S1.

The communication terminal 1A, 1B of the vehicle 10 may be a wireless communication device incorporated in advance in the vehicle 10, or may be a mobile terminal carried by an occupant in the vehicle 10. The mobile terminal of the occupant temporarily serves as an on-vehicle wireless communication device, by the mobile terminal being connected to an in-vehicle LAN of the vehicle 10.

The communication terminal 1C is implemented as a mobile terminal carried by a pedestrian 11. Thus, the vehicle 10 can perform "pedestrian-to-vehicle communication" through direct wireless communication in the slice S1.

The communication terminal 1D is implemented as a wireless communication device mounted to a roadside sensor 12. The communication terminal 1E is implemented as a wireless communication device mounted to a traffic signal controller 13. Thus, the vehicle 10 can perform "roadside-to-vehicle communication" through direct wireless communication in the slice S1.

The roadside sensor 12 of the present embodiment is implemented as an image sensor, for example, but is not limited to an image sensor. That is, the roadside sensor 12 may be any infrastructure-side sensor device for sensing traffic information such as an in-flow traffic volume and the presence/absence of a pedestrian. The roadside sensor 12 may be a vehicle detector, an optical beacon, or the like. In the case of an optical beacon, parking area information, signal lighting information, and the like can also be provided.

Service requirements of the slices S1 to S4 are as follows, for example. That is, delay time periods D1 to D4 allowed for the slices S1 to S4 are defined such that $D1<D2<D3<D4$ is satisfied. For example, D1=1 ms, D2=10 ms, D3=1 s, and D4=5 s. In addition, data communication traffic C1 to C4 per predetermined period (for example, one day) allowed for the slices S1 to S4 are defined such that $C1<C2<C3<C4$ is satisfied. For example, C1=20 GB, C2=100 GB, C3=2 TB, and C4=10 TB.

[Overall Configuration of Driving Support System]

Figure 2:
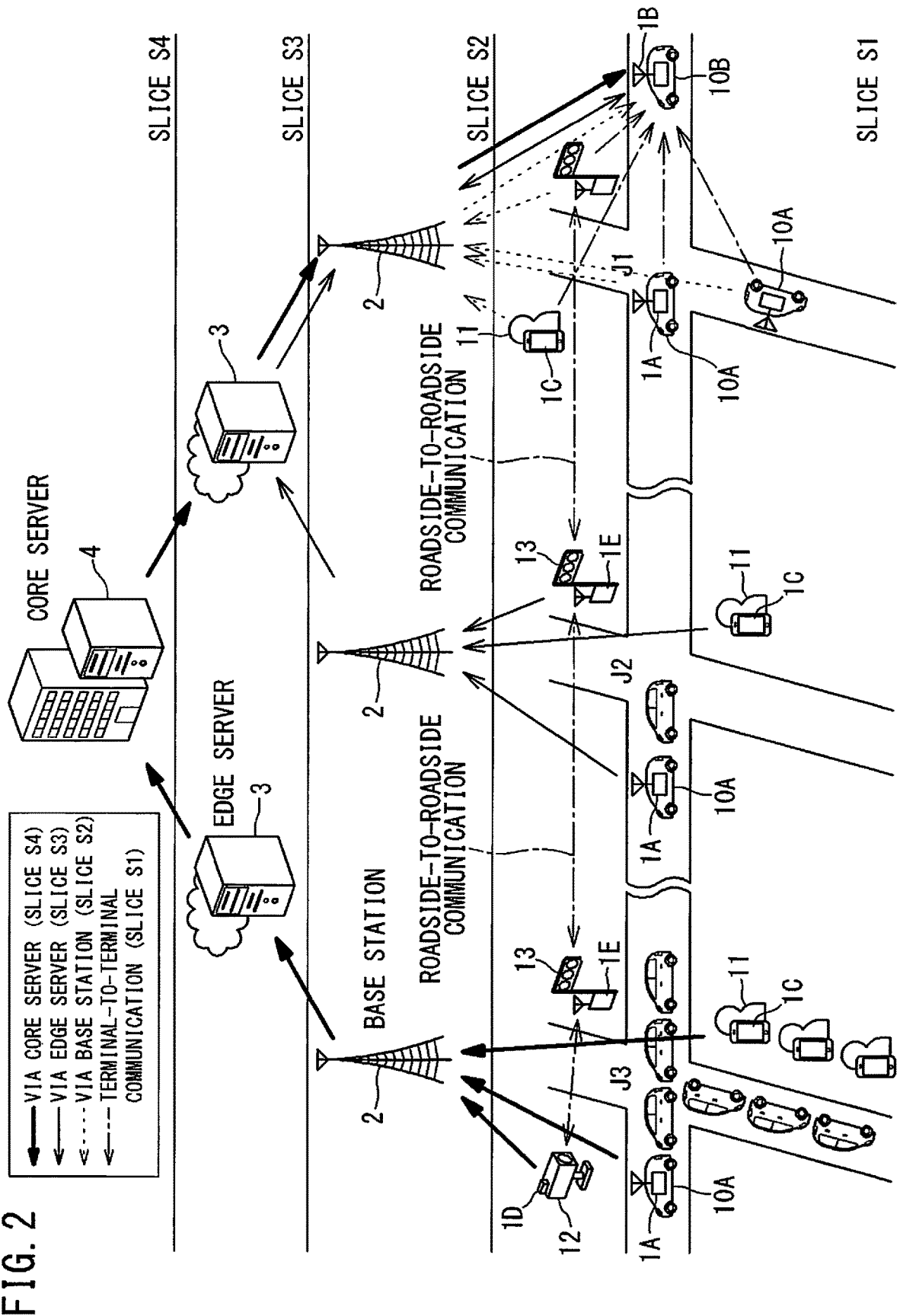
FIG. 2 is a diagram showing an overall configuration of a driving support system according to the embodiment of the present invention.

FIG. 2 is a diagram showing an overall configuration of a driving support system according to the embodiment of the present disclosure.

The driving support system of the present embodiment is a system that provides a vehicle 10 with service information useful for driving support control of the vehicle 10, by use of the wireless communication system shown in FIG. 1.

In FIG. 2, a "vehicle 10A" means a vehicle 10 that provides information to the system, and a "vehicle 10B" means a vehicle 10 (target vehicle) that receives information from the system.

That is, when a vehicle 10 acts as a vehicle on the information providing side, this vehicle 10 is denoted as a "vehicle 10A", and when the same vehicle 10 acts as a vehicle on the information acquiring side, this vehicle 10 is denoted as a "vehicle 10B". In addition, the communication terminal 1A means a communication terminal of the vehicle 10A (information providing terminal), and the communication terminal 1B means a communication terminal of the vehicle 10B (information acquiring terminal).

An intersection J1 is an intersection closest to the vehicle 10B that is advancing thereto. An intersection J2 is an intersection at a middle distance (for example, 300 m to 400 m) from the intersection J1. An intersection J3 is an intersection at a long distance (for example, 500 to 1000 m) from the intersection J1.

Here, it is assumed that the route to be traveled by the vehicle 10B, which is to receive information, passes the intersection J1→the intersection J2→the intersection J3→a predetermined point on the left side of the intersection J3.

In FIG. 2, chain line arrows indicate communication between the communication terminals 1A to 1E (node N1) in the slice S1. Broken line arrows indicate communication performed via a base station 2 (node N2) in the slice S2.

Similarly, thin line arrows indicate communication performed via an edge server 3 (node N3) in the slice S3. Thick line arrows indicate communication performed via a core server 4 (node N4) in the slice S4.

Provision information transmitted by the communication terminal 1A of the vehicle 10A includes sensor information measured by the vehicle 10A.

The sensor information of the vehicle 10A includes, for example: image data (moving picture or still picture) of an on-vehicle camera; measurement data of a millimeter-wave radar and/or LiDAR (Laser Imaging Detection and Ranging); vehicle information transmitted through in-vehicle communication in a CAN (Controller Area Network); position information measured by a GPS function of the vehicle 10A; and the like.

Provision information transmitted by the communication terminal 1C of the pedestrian 11 includes sensor information measured by the communication terminal 1C.

Sensor information of the communication terminal 1C includes position information measured by a GPS function of the communication terminal 1C (position information of the pedestrian 11), for example.

Provision information transmitted by the communication terminal 1D of the roadside sensor 12 includes sensor information measured by the roadside sensor 12.

The sensor information of the roadside sensor 12 includes: in a case where the roadside sensor 12 is an image sensor, image data (moving picture or still picture) photographed by the image sensor; the number of vehicles (in-flow traffic volume) extracted from the image data; and the like.

Provision information transmitted by the communication terminal 1E of the traffic signal controller 13 includes: signal information of the intersection J3 where the traffic signal controller 13 is installed; and various types of sensor information received from the communication terminals 1A, 1C, 1D.

Provision information of the communication terminal 1E may be sensor information received from neighborhood communication terminals 1A, 1C, 1D, or may be information received from a traffic signal controller 13 of another intersection J3 through roadside-to-roadside communication in the slice S1.

The communication terminal 1A, 1C to 1E transmits provision information that the communication terminal 1A, 1C to 1E is holding at the present moment, to other nodes N1 to N4. For example, when the communication terminal 1A, 1C to 1E has received a request message from the communication terminal 1B of a vehicle 10B, the communication terminal 1A, 1C to 1E transmits provision information that the communication terminal 1A, 1C to 1E is holding, to the communication terminal 1B.

The communication terminal 1A, 1C to 1E can also uplink-transmit the provision information that the communication terminal 1A, 1C to 1E is holding, to a base station 2, an edge server 3, and a core server 4, through communication using the slices S2 to S4.

Thus, through uplink communication using the slice S2, the base station 2 (node N2) can collect the provision information of which transmission source is the communication terminal 1A, 1C to 1E (node N1), from each node N1. This process corresponds to information collection performed by the base station 2.

In addition, through downlink communication using the slice S2, the base station 2 (node N2) can transmit provision information of which transmission source is the base station 2 itself, to the communication terminal 1B of the vehicle 10B. This process corresponds to information provision performed by the base station 2.

Similarly, through uplink communication using the slice S3 and via the base station 2, the edge server 3 (node N3) can collect the provision information of which transmission source is the communication terminal 1A, 1C to 1E (node N1), from each node N1. This process corresponds to information collection performed by the edge server 3.

In addition, through downlink communication using the slice S3 and via the base station 2, the edge server 3 (node N3) can transmit provision information of which transmission source is the edge server 3 itself, to the communication terminal 1B of the vehicle 10B. This process corresponds to information collection performed by the edge server 3.

Similarly, through uplink communication using the slice S4 and via the base station 2 and the edge server 3, the core server 4 (node N4) can collect the provision information of which transmission source is the communication terminal 1A, 1C to 1E (node N1), from each node N1. This process corresponds to information collection performed by the core server 4.

In addition, through downlink communication using the slice S4 and via the base station 2 and the edge server 3, the core server 4 (node N4) can transmit provision information of which transmission source is the core server 4 itself, to the communication terminal 1B of the vehicle 10B. This process corresponds to information provision performed by the core server 4.

The base station 2 (node N2), the edge server 3 (node N3) and the core server 4 (node N4) may each downlink-transmit (transfer) the provision information received from the node N1 as is, or may downlink-transmit traffic information calculated from the received provision information.

However, the delay time period D2 allowed for the slice S2 is a relatively short time period (for example, 10 ms), and the processing capability of the base station 2 is not so high. Thus, preferably, the base station 2 transfers the provision information received from another apparatus as is.

In contrast, the edge server 3 and the core server 4 have far higher information processing capabilities than the base station 2 or the like. Thus, the edge server 3 and the core server 4 preferably calculate traffic information, such as an in-flow traffic volume, the presence/absence of a pedestrian, accident information, and congestion information, on the basis of sensor information and signal information (hereinafter, also referred to as "source data"), and use the calculated traffic information as provision information for the vehicle 10B.

In this case, preferably, the provision information transmitted by the edge server 3 is traffic information of which real-timeness is not required and which is effective even after a delay by the delay time period D3 (for example, 1 s) that is allowed for the slice S3.

Similarly, preferably, the provision information transmitted by the core server 4 is traffic information of which real-timeness is not required and which is effective even after a delay by the delay time period D4 (for example, 5 s) that is allowed for the slice S4.

[On-Vehicle Apparatus of Vehicle]

Figure 3:
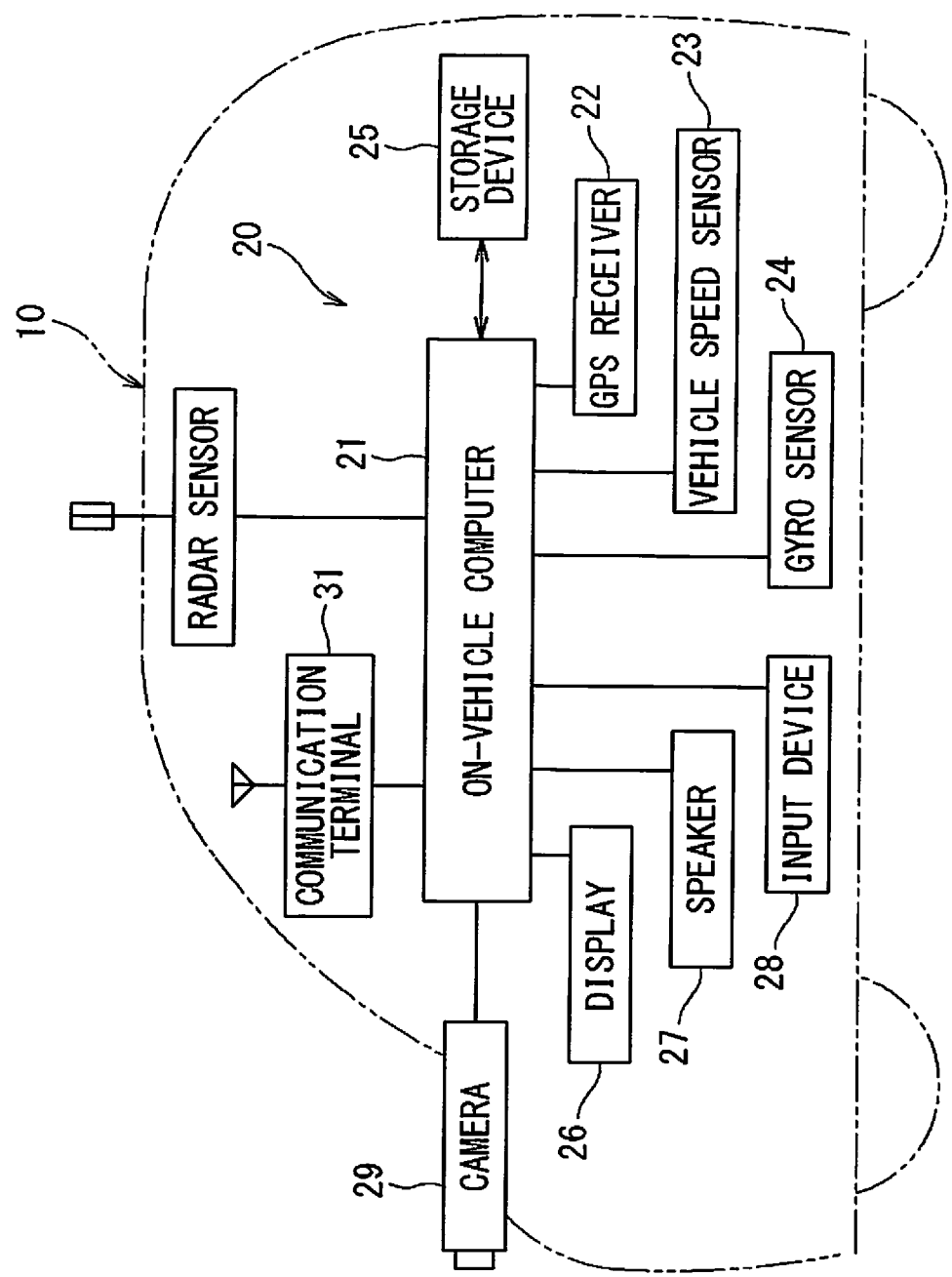
FIG. 3 is a block diagram showing an example of a configuration of an on-vehicle apparatus of a vehicle.

FIG. 3 is a block diagram showing an example of a configuration of an on-vehicle apparatus 20 of the vehicle 10.

As shown in FIG. 3, the on-vehicle apparatus 20 of the vehicle 10 includes an on-vehicle computer 21, a GPS receiver 22, a vehicle speed sensor 23, a gyro sensor 24, a storage device 25, a display 26, a speaker 27, an input device 28, an on-vehicle camera 29, a radar sensor 30, and a communication terminal 31. The communication terminal 31 is implemented as the communication terminal 1A, 1B, described above.

The on-vehicle computer 21 is a computer device which performs route search for the vehicle 10, operation control of other electronic devices 22 to 31, and the like. The on-vehicle computer 21 obtains a vehicle position of the vehicle 10 on the basis of a GPS signal periodically acquired by the GPS receiver 22. The on-vehicle computer 21 complements the vehicle position and the heading on the basis of input signals of the vehicle speed sensor 23 and the gyro sensor 24, and grasps the accurate present position and heading of the vehicle 10.

The GPS receiver 22, the vehicle speed sensor 23, and the gyro sensor 24 are sensors that measure the present position, the speed, and the orientation of the vehicle 10.

The storage device 25 includes a map database. The map database provides road map data to the on-vehicle computer 21. The road map data includes link data and node data, and is stored in a recording medium such as a DVD. As the recording medium, other than the DVD, various recording mediums, such as a CD-ROM, a memory card, and a hard disk, can be adopted.

The storage device 25 reads out necessary road map data from the recording medium and provides the road map data to the on-vehicle computer 21.

The display 26 and the speaker 27 are output devices for notifying the occupant of the vehicle 10 about various types of information generated by the on-vehicle computer 21.

Specifically, the display 26 displays an input screen to be used in route search, a map image around the vehicle 10, route information up to a destination, and the like. The speaker 27 outputs, by sound, announcement and the like for guiding the vehicle 10 to the destination. These output devices can also notify the occupant of traffic information included in provision information received by the communication terminal 31.

The input device 28 is a device with which the occupant of the vehicle 10 performs various input operations. The input device 28 is implemented as a combination of an operation switch and a joystick provided at the steering wheel, a touch panel provided at the display 26, and the like.

A speech recognition device which receives an input through speech recognition of the occupant can be used as the input device 28. The input signal of the input performed by the occupant to the input device 28 is sent to the on-vehicle computer 21.

The on-vehicle camera 29 is implemented as an image sensor that photographs an area in front of the vehicle 10. The radar sensor 30 is implemented as a sensor that detects an object present in front of or around the vehicle 10, by a millimeter-wave radar, a LiDAR method, or the like.

On the basis of measurement information from the on-vehicle camera 29 and the radar sensor 30, the on-vehicle computer 21 can perform driving support control such as: causing the display 26 to output an alert to the occupant who is driving; or executing forced brake intervention.

The on-vehicle computer 21 is configured as an arithmetic processing unit such as a microcomputer having various control programs installed therein.

By executing the above control programs, the on-vehicle computer 21 can perform various navigation functions, such as a function of causing the display 26 to display a map image, a function of calculating a route (including the position of a relay point if there is any) from the start place to the destination, and a function of guiding the vehicle 10 to the destination along the calculated route.

When the on-vehicle computer 21 has received provision information from a plurality of nodes N1 to N4, the on-vehicle computer 21 can perform a determination process of whether or not adoption of the received provision information is allowed.

When predetermined provision information is to be adopted, the on-vehicle computer 21 can also perform a driving support control based on the provision information. The driving support control of the vehicle 10 may be a control of causing the display 26 or the like to output an alert to the occupant, or may be a control of forcedly performing deceleration or the like of the vehicle 10.

[One Example of Acquisition Process of Provision Information]

FIG. 4 is a sequence diagram showing one example of an acquisition process of provision information performed by the vehicle 10B.

As shown in FIG. 4, when the communication terminal 1B of the vehicle 10B is to receive information from the system, the communication terminal 1B transmits request messages R1 to R4 to other nodes N1 to N4, respectively (step ST11).

The respective nodes N1 to N4 having received the request messages R1 to R4 transmit response messages A1 to A4 to the communication terminal 1B of the vehicle 10B which is the transmission source (step ST12).

The response message A1 to A4 includes: provision information K1 to K4 held by the node N1 to N4; and an occurrence time and an occurrence position of the provision information K1 to K4. These occurrence time and occurrence position are the occurrence time and occurrence position of source data.

Therefore, when the provision information K1 to K4 is sensor information, the occurrence time and occurrence position means the time and the position at which the sensor information has been measured.

Depending on the case, the position at which the sensor information has been measured may be: the position (for example, vehicle position, pedestrian position, or the like) of the sensor itself that has generated the sensor information; the position of a measurement target area (for example, photographing area of the image sensor) of the sensor that has generated the sensor information; or the position (for example, vehicle position, pedestrian position, or the like based on image data of the image sensor) of a measurement target object.

When the provision information K1 to K4 is traffic information generated from sensor information, the occurrence time and occurrence position means the time and the position at which the sensor information, which is the source of the traffic information, has been measured.

Next, the vehicle 10B (specifically, the on-vehicle computer 21 shown in FIG. 3) determines whether or not adoption of the provision information K1 to K4 acquired from the respective nodes N1 to N4 is allowed (step ST13).

In this determination process, first, the vehicle 10B narrows provision information K1 to K4 that is useful for the vehicle 10B, on the basis of at least one of the present position, the vehicle speed, the heading direction, and the travel route of the vehicle 10B. Specifically, the vehicle 10B does not adopt provision information regarding positions upstream of the vehicle 10B.

Then, the vehicle 10B determines whether or not adoption of the provision information K1 to K4 is allowed, on the basis of "selection criteria 1" below.

(Selection Criteria 1)

With respect to the provision information K1 acquired from the node N1, when the travel distance from the present position of the vehicle 10B to the occurrence position of the provision information K1 is within a predetermined distance L1 (for example, 50 m), the vehicle 10B takes in the provision information K1, or otherwise, the vehicle 10B does not take in the provision information K1.

With respect to the provision information K2 acquired from the node N2, when the travel distance from the present position of the vehicle 10B to the occurrence position of the provision information K2 is within a predetermined distance L2 (for example, 200 m), the vehicle 10B takes in the provision information K2, or otherwise, the vehicle 10B does not take in the provision information K2.

With respect to the provision information K3 acquired from the node N3, when the travel distance from the present position of the vehicle 10B to the occurrence position of the provision information K3 is within a predetermined distance L3 (for example, 700 m), the vehicle 10B takes in the provision information K3, or otherwise, the vehicle 10B does not take in the provision information K3.

With respect to the provision information K4 acquired from the node N4, when the travel distance from the present position of the vehicle 10B to the occurrence position of the provision information K4 is within a predetermined distance L4 (for example, 3 km), the vehicle 10B takes in the provision information K4, or otherwise, the vehicle 10B does not take in the provision information K4.

Here, with reference to FIG. 2, a case is assumed in which: the provision information K1 to K4 of the nodes N1 to N4 is sensor information (image data) of the roadside sensor 12 at the intersection J3; and the vehicle 10B is traveling before the intersection J1.

In addition, it is assumed that the travel distance from the present position of the vehicle 10B to the intersection J3 (the occurrence position of the image data), which is the installation point of the roadside sensor 12, is 500 m, for example. In this case, determination on whether or not adoption of the provision information K1 to K4 is allowed, based on the above-described selection criteria 1, is performed as follows.

Since the travel distance (500 m) exceeds the predetermined distance L1 (50 m), the vehicle 10B does not take in the image data of the roadside sensor 12 acquired from the node N1.

Since the travel distance (500 m) exceeds the predetermined distance L2 (200 m), the vehicle 10B does not take in the image data of the roadside sensor 12 acquired from the node N2.

Since the travel distance (500 m) is within the predetermined distance L3 (700 m), the vehicle 10B takes in the image data of the roadside sensor 12 acquired from the node N3.

Since the travel distance (500 m) is within the predetermined distance L4 (3 km), the vehicle 10B takes in the image data of the roadside sensor 12 acquired from the node N4.

When the vehicle 10B has acquired a plurality of pieces of provision information K1 to K4 derived from sensor information of the same kind, such as sensor information of the same roadside sensor 12 or sensor information of the same vehicle 10A, it is preferable that the vehicle 10B adopts the provision information K1 to K4 that is derived from sensor information having the closest occurrence position from the present position of the vehicle 10B.

Accordingly, the latest provision information K1 to K4 can be preferentially adopted, and driving support control having high real-timeness can be performed.

Meanwhile, when provision information K1 to K4 derived from sensor information of the same kind having the same occurrence position has been acquired from different nodes N1 to N4, whether or not adoption of the provision information K1 to K4 is allowed may be determined in accordance with the priority levels (for example, S1>S2>S3>S4) of the slices S1 to S4 set in advance.

In this case, when the vehicle 10B has acquired image data of the same roadside sensor 12 from the node N3 and the node N4, the vehicle 10B adopts the image data acquired from the node N3.

In the determination process in step ST13, the vehicle 10B may determine whether or not adoption of the provision information K1 to K4 is allowed, on the basis of "selection criteria 2" below.

(Selection Criteria 2)

With respect to the provision information K1 acquired from the node N1, when the vehicle 10B is predicted to reach the occurrence position of the provision information K1 within a predetermined time period T1 (for example, 5 seconds) from the occurrence time of the provision information K1, the vehicle 10B takes in the provision information K1, or otherwise, the vehicle 10B does not take in the provision information K1.

With respect to the provision information K2 acquired from the node N2, when the vehicle 10B is predicted to reach the occurrence position of the provision information K2 within a predetermined time period T2 (for example, 10 seconds) from the occurrence time of the provision information K2, the vehicle 10B takes in the provision information K2 or otherwise, the vehicle 10B does not take in the provision information K2.

With respect to the provision information K3 acquired from the node N3, when the vehicle 10B is predicted to reach the occurrence position of the provision information K3 within a predetermined time period T3 (for example, 1 minute) from the occurrence time of the provision information K3, the vehicle 10B takes in the provision information K3, or otherwise, the vehicle 10B does not take in the provision information K3.

With respect to the provision information K4 acquired from the node N4, when the vehicle 10B is predicted to reach the occurrence position of the provision information K2 within a predetermined time period T4 (for example, 5 minutes) from the occurrence time of the provision information K4, the vehicle 10B takes in the provision information K4, or otherwise, the vehicle 10B does not take in the provision information K4.

Here, with reference to FIG. 2, a case is assumed in which: the provision information K1 to K4 from the nodes N1 to N4 is sensor information (image data of the on-vehicle camera) of the vehicle 10A traveling near the intersection J1; and the vehicle 10B is traveling before the intersection J1.

In addition, it is assumed that the predicted time period in which the vehicle 10B travels from the present position thereof and reaches the traveling position of the vehicle 10A (the occurrence position of the image data) is 8 seconds, for example. In this case, determination on whether or not adoption of the provision information K1 to K4 is allowed, based on the above-described selection criteria 2, is performed as follows.

Since the predicted time period (8 seconds) exceeds the predetermined time period T1 (5 seconds), the vehicle 10B does not take in the image data of the vehicle 10A acquired from the node N1.

Since the predicted time period (8 seconds) is within the predetermined time period T2 (10 seconds), the vehicle 10B takes in the image data of the vehicle 10A acquired from the node N2.

Since the predicted time period (8 seconds) is within the predetermined time period T3 (1 minute), the vehicle 10B takes in the image data of the vehicle 10A acquired from the node N3.

Since the predicted time period (8 seconds) is within the predetermined time period T4 (5 minutes), the vehicle 10B takes in the image data of the vehicle 10A acquired from the node N4.

When the vehicle 10B has acquired a plurality of pieces of provision information K1 to K4 derived from sensor information of the same kind, such as sensor information of the same roadside sensor 12 or sensor information of the same vehicle 10A, it is preferable that the vehicle 10B adopts the provision information K1 to K4 that is derived from sensor information having the shortest estimated time period from the present moment.

Accordingly, the latest provision information K1 to K4 can be preferentially adopted, and driving support control having high real-timeness can be performed.

Meanwhile, when provision information K1 to K4 derived from sensor information of the same kind having the same occurrence position has been acquired from different nodes N1 to N4, whether or not adoption of the provision information K1 to K4 is allowed may be determined in accordance with the priority levels (for example, S1>S2>S3>S4) of the slices S1 to S4 set in advance.

In this case, when the vehicle 10B has acquired image data of the same vehicle 10A from the node N2, the node N3, and the node N4, the vehicle 10B adopts the image data acquired from the node N2.

As described above, according to the wireless communication system of the present embodiment, whether sensor information and signal information generated by a node N1 are shared: through direct communication between nodes N1 (the slice S1); via the base station 2 (the slice S2); via the edge server 3 (the slice S3); or via the core server 4 (the slice S4), can be changed in accordance with the distance or the time period to the point where the sensor information and the signal information are utilized.

[Another Example of Acquisition Process of Provision Information]

FIG. 5 is a sequence diagram showing another example of the acquisition process of provision information performed by the vehicle 10B.

As shown in FIG. 5, when the communication terminal 1B of the vehicle 10B is to receive information from the system, the communication terminal 1B transmits request messages R1 to R4 to other nodes N1 to N4, respectively (step ST21). The request messages R1 to R4 include the present position, the vehicle speed, the heading direction, and the travel route of the vehicle 10B.

The respective nodes N1 to N4 having received the request messages R1 to R4 determine whether or not adoption of provision information K1 to K4 is allowed (steps ST22 to ST25).

In this determination process, first, the nodes N1 to N4 narrow provision information K1 to K4 that is useful for the vehicle 10B, on the basis of at least one of the present position, the vehicle speed, the heading direction, and the travel route of the vehicle 10B. For example, the nodes N1 to N4 do not adopt provision information regarding positions upstream of the vehicle 10B, and the like.

Then, the nodes N1 to N4 determine whether or not adoption of the provision information K1 to K4 is allowed, on the basis of "selection criteria 3" below, and transmit, to the communication terminal 1B of the vehicle 10B, response messages A1 to A4 including the provision information K1 to K4 that has been determined as adoptable (step ST26).

Specifically, the nodes N1 to N4 determine whether or not adoption of the provision information K1 to K4 is allowed, on the basis of the "selection criteria 3" below.

(Selection Criteria 3)

When the travel distance from the present position of the vehicle 10B to the occurrence position of the provision information K1 is within the predetermined distance L1 (for example, 50 m), the node N1 transmits the provision information K1 to the vehicle 10B, or otherwise, the node N1 does not transmit the provision information K1.

When the travel distance from the present position of the vehicle 10B to the occurrence position of the provision information K2 is within the predetermined distance L2 (for example, 200 m), the node N2 transmits the provision information K2 to the vehicle 10B, or otherwise, the node N2 does not transmit the provision information K2.

When the travel distance from the present position of the vehicle 10B to the occurrence position of the provision information K3 is within the predetermined distance L3 (for example, 700 m), the node N3 transmits the provision information K3 to the vehicle 10B, or otherwise, the node N3 does not transmit the provision information K3.

When the travel distance from the present position of the vehicle 10B to the occurrence position of the provision information K4 is within the predetermined distance L4 (for example, 3 km), the node N4 transmits the provision information K4 to the vehicle 10B, or otherwise, the node N4 does not transmit the provision information K4.

Here, with reference to FIG. 2, a case is assumed in which: the provision information K1 to K4 of the nodes N1 to N4 is a pedestrian position transmitted by a mobile terminal 1C of the pedestrian 11 crossing the intersection J1; and the vehicle 10B is traveling before the intersection J1.

In addition, it is assumed that the travel distance from the present position of the vehicle 10B to the pedestrian position (the occurrence position of the position information) is 40 m, for example. In this case, determination on whether or not adoption of the provision information K1 to K4 is allowed, based on the above-described selection criteria 3, is performed as follows.

Since the travel distance (40 m) is within the predetermined distance L1 (50 m), the node N1 transmits pedestrian position to the vehicle 10B.

Since the travel distance (40 m) is within the predetermined distance L2 (200 m), the node N2 transmits the pedestrian position to the vehicle 10B.

Since the travel distance (40 m) is within the predetermined distance L3 (700 m), the node N3 transmits the pedestrian position to the vehicle 10B.

Since the travel distance (40 m) is within the predetermined distance L4 (3 km), the node N4 transmits the pedestrian position to the vehicle 10B.

When the vehicle 10B has acquired a plurality of pieces of provision information K1 to K4 derived from sensor information of the same kind, such as sensor information of the same roadside sensor 12 or sensor information of the same vehicle 10A, it is preferable that the vehicle 10B adopts the provision information K1 to K4 that is derived from sensor information having the closest occurrence position from the present position of the vehicle 10B.

Accordingly, the latest provision information K1 to K4 can be preferentially adopted, and driving support control having high real-timeness can be performed.

Meanwhile, when the provision information K1 to K4 derived from sensor information of the same kind having the same occurrence position has been acquired from different nodes N1 to N4, whether or not adoption of the provision information K1 to K4 is allowed may be determined in accordance with the priority levels (for example, S1>S2>S3>S4) of the slices S1 to S4 set in advance.

In this case, when the vehicle 10B has acquired image data of the same roadside sensor 12 from the node N1, the node N2, the node N3, and the node N4, the vehicle 10B adopts the image data acquired from the node N1.

In the determination process in steps ST22 to ST24, the nodes N1 to N4 may determine whether or not adoption of the provision information K1 to K4 is allowed, on the basis of "selection criteria 4" below.

(Selection Criteria 4)

When the vehicle 10B is predicted to reach the occurrence position of the provision information K1 within the predetermined time period T1 (for example, 5 seconds) from the occurrence time of the provision information K1, the node N1 transmits the provision information K1 to the vehicle 10B, or otherwise, the node N1 does not transmit the provision information K1.

When the vehicle 10B is predicted to reach the occurrence position of the provision information K2 within the predetermined time period T2 (for example, 10 seconds) from the occurrence time of the provision information K2, the node N2 transmits the provision information K2 to the vehicle 10B, or otherwise, the node N2 does not transmit the provision information K2.

When the vehicle 10B is predicted to reach the occurrence position of the provision information K3 within the predetermined time period T3 (for example, 1 minute) from the occurrence time of the provision information K3, the node N3 transmits the provision information K3 to the vehicle 10B, or otherwise, the node N3 does not transmit the provision information K3.

When the vehicle 10B is predicted to reach the occurrence position of the provision information K4 within the predetermined time period T4 (for example, 5 minutes) from the occurrence time of the provision information K4, the node N4 transmits the provision information K4 to the vehicle 10B, or otherwise, the node N4 does not transmit the provision information K4.

Here, with reference to FIG. 2, a case is assumed in which: the provision information K1 to K4 of the nodes N1 to N4 is sensor information (image data) of the roadside sensor 12 at the intersection J3; and the vehicle 10B is traveling before the intersection J1.

In addition, it is assumed that the predicted time period in which the vehicle 10B travels from the present position and reaches the intersection J3 (the occurrence position of the image data), which is the installation point of the roadside sensor 12, is 3 minutes, for example. In this case, determination on whether or not adoption of the provision information K1 to K4 is allowed, based on the above-described selection criteria 4, is performed as follows.

Since the predicted time period (3 minutes) exceeds the predetermined time period T1 (5 seconds), the node N1 does not transmit the image data of the roadside sensor 12 to the vehicle 10B.

Since the predicted time period (3 minutes) exceeds the predetermined time period T2 (10 seconds), the node N2 does not transmit the image data of the roadside sensor 12 to the vehicle 10B.

Since the predicted time period (3 minutes) exceeds the predetermined time period T3 (1 minute), the node N3 does not transmit the image data of the roadside sensor 12 to the vehicle 10B.

Since the predicted time period (3 minutes) is within the predetermined time period T4 (5 minutes), the node N4 transmits the image data of the roadside sensor 12 to the vehicle 10B.

When the vehicle 10B has acquired a plurality of pieces of provision information K1 to K4 derived from sensor information of the same kind, such as sensor information of the same roadside sensor 12 or sensor information of the same vehicle 10A, it is preferable that the vehicle 10B adopts the provision information K1 to K4 that is derived from sensor information having the shortest estimated time period from the present moment.

Accordingly, the latest provision information K1 to K4 can be preferentially adopted, and driving support control having high real-timeness can be performed.

Meanwhile, when the provision information K1 to K4 derived from sensor information of the same kind having the same occurrence position has been acquired from different nodes N1 to N4, whether or not adoption of the provision information K1 to K4 is allowed may be determined in accordance with the priority levels (for example, S1>S2>S3>S4) of the slices S1 to S4 set in advance.

In this case, if the vehicle 10B has acquired a plurality of pieces of image data of the same roadside sensor 12 from the node N4, which image data is to be adopted from among the plurality of pieces of image data cannot be determined on the basis of the priorities of the slices S1 to S4. Thus, the vehicle 10B adopts image data having the shortest estimated time period among the acquired plurality of pieces of image data.

[Operation Example of Driving Support System in Ordinary Road]

Figure 6:
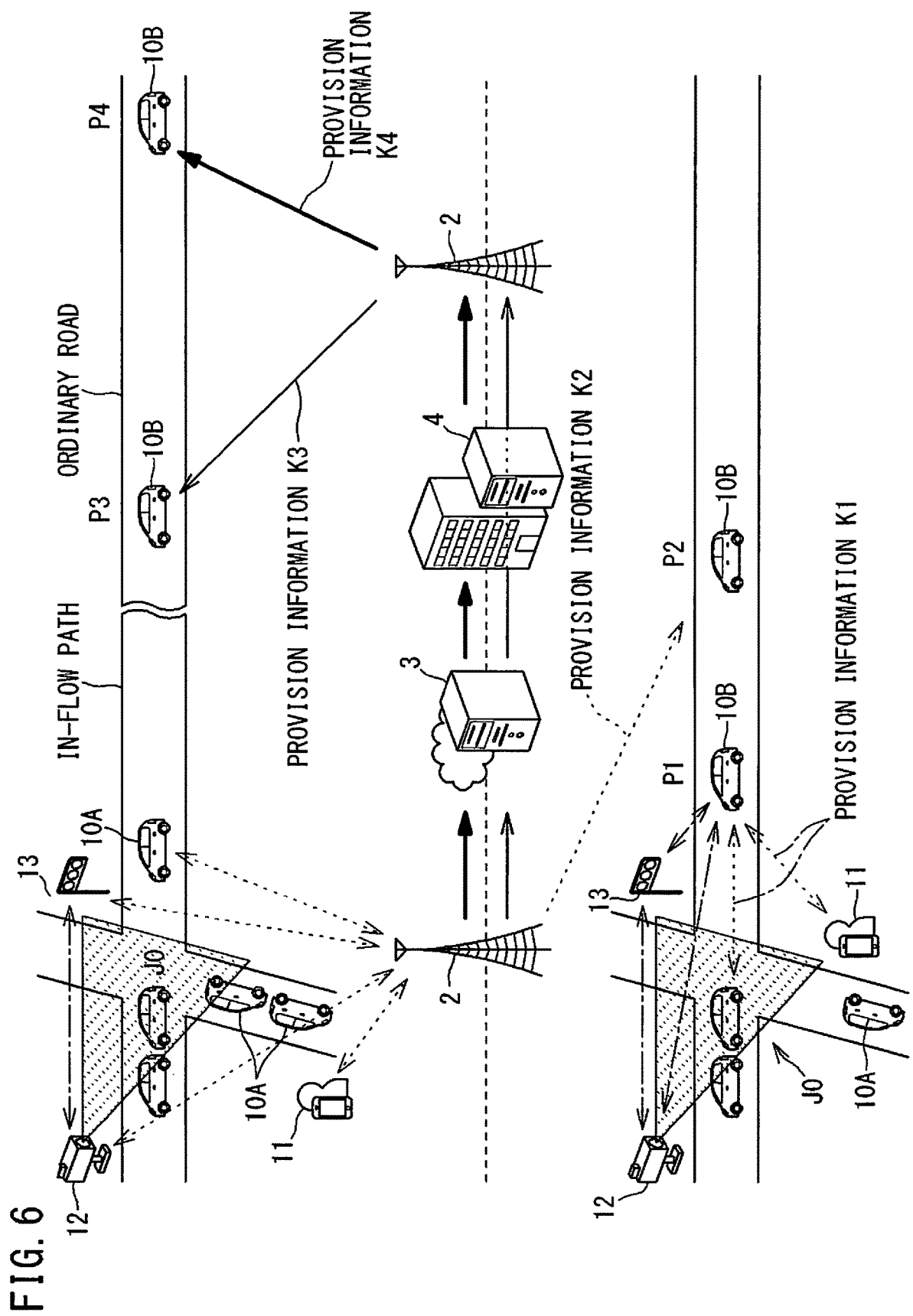
FIG. 6 is a diagram describing an operation example of the driving support system in ordinary roads.

FIG. 6 is a diagram describing an operation example of the driving support system in ordinary roads.

In FIG. 6, it is assumed that the vehicle 10B, which is to receive information, travels an in-flow path to an intersection J0 in the order of point P4→point P3→point P2→point P1.

In addition, it is assumed that each point P1 to P4 is separated from the intersection J0 by the distance below.
Point P1: 40 m from the intersection J0
Point P2: 180 m from the intersection J0
Point P3: 650 m from the intersection J0
Start point P4: 1000 m from the intersection J0

Thus, in a case where the above-described selection criteria 1 and 3 are adopted, the point P1 (=40 m) is determined to be within the predetermined distance L1 (=50 m), and the point P2 (=180 m) is determined to be within the predetermined distance L2 (=200 m).

The point P3 (=650 m) is determined to be within the predetermined distance L3 (=700 m), and the point P4 (=1000 m) is determined to be within the predetermined distance L4 (=3 km).

The vehicle 10B traveling at the point P4 takes in provision information K4 transmitted via the core server 4 from the slice S4.

Thus, at the point P4 separated by 1000 m from the intersection J0, the vehicle 10B can acquire sensor information and signal information collected at the intersection J0 and traffic information generated from the collected information by the core server 4.

The vehicle 10B traveling at the point P3 takes in provision information K3 transmitted via the edge server 3 from the slice S3, in addition to the provision information K4 transmitted via the core server 4 from the slice S4.

When the provision information K3 and K4 is information derived from sensor information of the same kind (for example, sensor information of the same vehicle 1A), the vehicle 10B preferentially adopts the provision information K3, which is the latest information.

The vehicle 10B traveling at the point P2 takes in provision information K2 transmitted via the base station 2 from the slice S2, in addition to the provision information K4 transmitted via the core server 4 from the slice S4 and the provision information K3 transmitted via the edge server 3 from the slice S3.

When the provision information K2 to K4 is information derived from sensor information of the same kind (for example, sensor information of the same vehicle 1A), the vehicle 10B preferentially adopts the provision information K2, which is the latest information.

The vehicle 10B traveling at the point P1 takes in provision information K1 transmitted through terminal-to-terminal communication from the slice S1, in addition to the provision information K4 transmitted via the core server 4 from the slice S4, the provision information K3 transmitted via the edge server 3 from the slice S3, and the provision information K2 transmitted via the base station 2 from the slice S2.

When the provision information K1 to K4 is information derived from sensor information of the same kind (for example, sensor information of the same vehicle 1A), the vehicle 10B preferentially adopts the provision information K1, which is the latest information.

[Operation Example of Driving Support System in Expressway]

Figure 7:
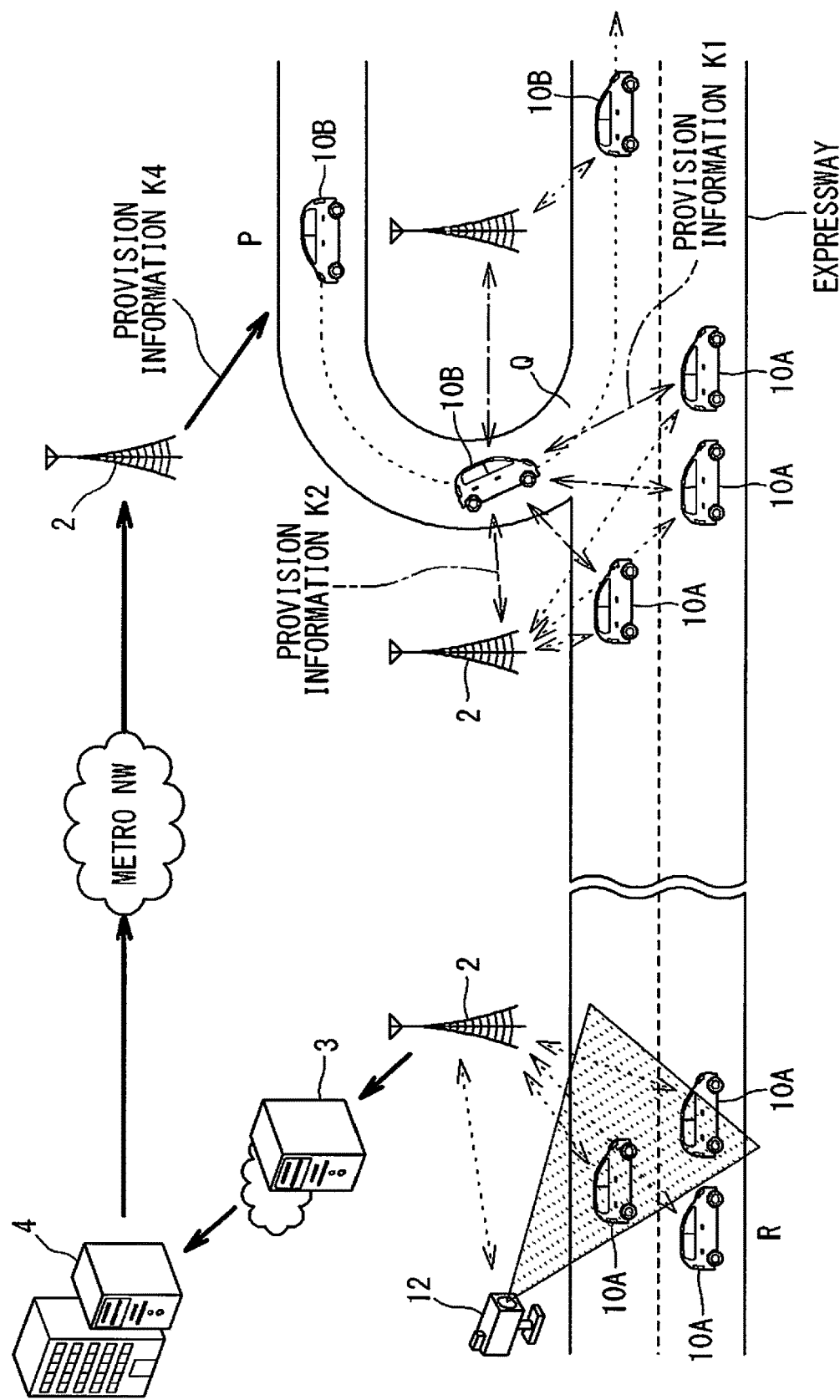
FIG. 7 is a diagram describing an operation example of the driving support system in an expressway.

FIG. 7 is a diagram describing an operation example of the driving support system in an expressway.

In FIG. 7, it is assumed that the vehicle 10B, which is to receive information, travels a U-shaped path section from a predetermined point P in an in-flow path joining an expressway, and enters the expressway at a junction Q.

A point R is a monitor point by a roadside sensor 12 installed at a position separated by a predetermined distance to the upstream side from the junction Q. The point P in the in-flow path is assumed to be at a position separated by 800 m from the monitor point R, and the base stations 2 are present near the junction Q.

Thus, in a case where the above-described selection criteria 1 and 3 are adopted, the point P (=800 m) is determined to exceed each of the predetermined distance L1 (=50 m), the predetermined distance L2 (=200 m), and the predetermined distance L3 (=700 m), and is determined to be within the predetermined distance L4 (=3 km).

The vehicle 10B traveling at the point P takes in provision information K4 transmitted via the core server 4 from the slice S4.

Thus, at the point P separated by 800 m from the monitor point R, the vehicle 10B can acquire traffic information generated, by the core server 4, from sensor information (image data of the roadside sensor 12 and the like) collected at the monitor point R.

The vehicle 10B having entered the U-shaped path section takes in provision information K2 transmitted via the base station 2 from the slice S2, in addition to the provision information K4 transmitted via the core server 4 from the slice S4.

When the provision information K2 and K4 is information derived from sensor information of the same kind (for example, sensor information of the same vehicle 1A), the vehicle 10B preferentially adopts the provision information K2, which is the latest information.

The vehicle 10B having reached the junction Q takes in provision information K1 transmitted through terminal-to-terminal communication from the slice S1, in addition to the provision information K4 transmitted via the core server 4 from the slice S4, and the provision information K2 transmitted via the base station 2 from the slice S2.

When the provision information K1 and K2 is information derived from sensor information of the same kind (for example, sensor information of the same vehicle 1A), the vehicle 10B preferentially adopts the provision information K1, which is the latest information.

Effects of the Present Embodiment

As described above, according to the wireless communication system of the present embodiment, whether or not adoption of the provision information K1 to K4 is allowed is determined on the basis of: the present position of the vehicle (target vehicle) 10B, to which provision information K1 to K4 is to be provided; and the occurrence position of source data (sensor information of the vehicle 10A and the roadside sensor 12, and the like) usable for driving support control (see FIG. 4 and FIG. 5). Therefore, among pieces of the provision information K1 to K4, provision information that is suitable for the vehicle 10B can be provided to the vehicle 10B. Thus, information provision to the vehicle 10B can be appropriately performed.

According to the wireless communication system of the present embodiment, a determination unit (the on-vehicle computer 21) provided in the vehicle 10B comprehensively determines whether or not adoption of the provision information K1 to K4 is allowed (see FIG. 4).

Therefore, there is no need to install a function of determining whether or not adoption of the provision information K1 to K4 is allowed, into other stations such as the base station 2 and the servers 3, 4, and work cost necessary for construction of the wireless communication system can be suppressed.

According to the wireless communication system of the present embodiment, a determination unit provided in a distributed manner in: apparatuses (the vehicle 10A, the roadside sensor 12, and the like) having the communication terminals 1A, 1C to 1E; the base station 1; and the servers 3, 4, determines whether or not adoption of the provision information K1 to K4 is allowed (see FIG. 5).

Therefore, there is no need to provide the vehicle 10B with a determination unit which comprehensively determines whether or not adoption of the provision information K1 to K4 is allowed, and information processing capability of the vehicle 10B is allowed to be low.

[Occurrence Area of Provision Information]

Figure 8:
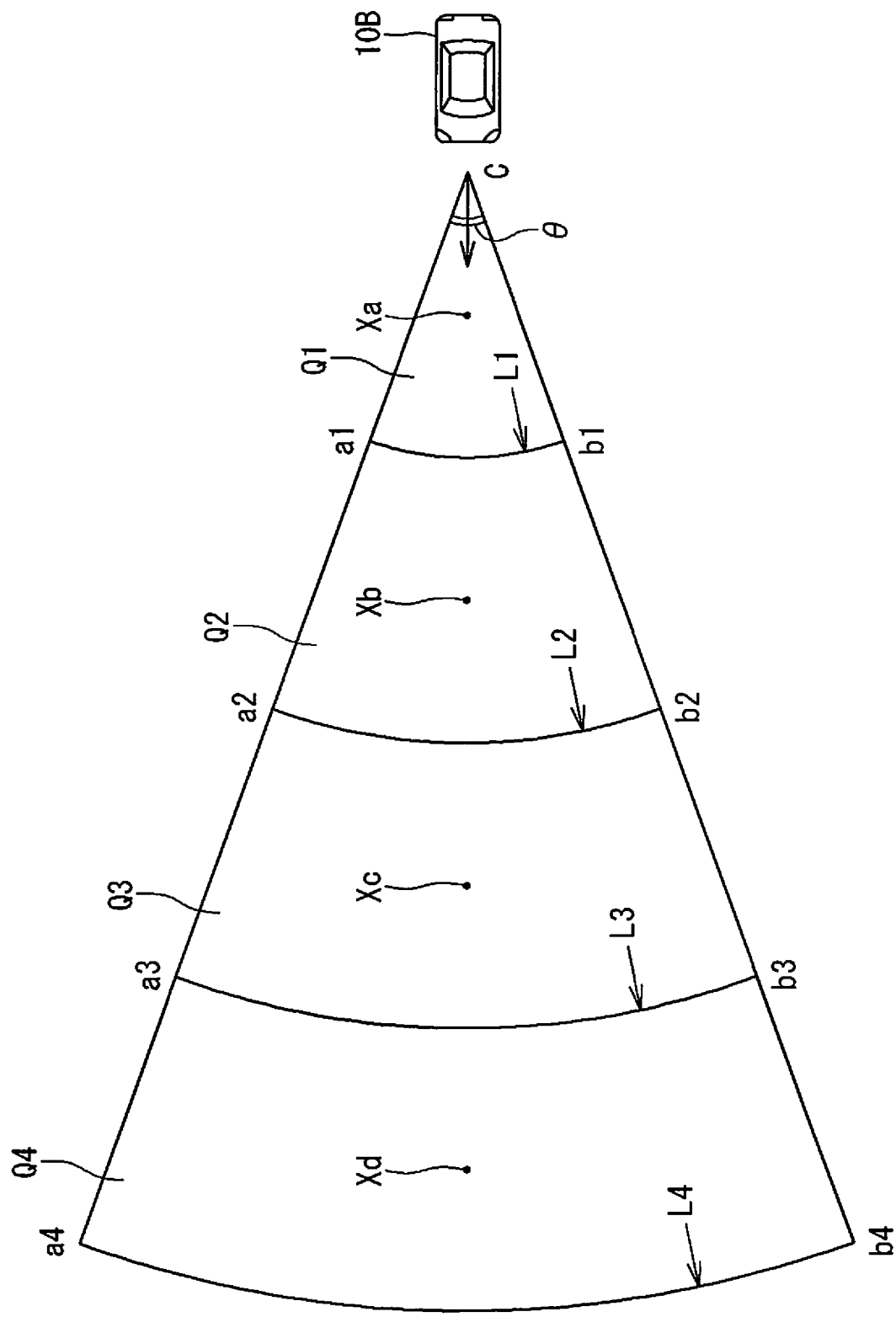
FIG. 8 is a conceptual diagram of an occurrence area of source data that can be acquired by the vehicle.

FIG. 8 is a conceptual diagram of an occurrence area of source data that can be acquired by the vehicle 10B.

Here, it is assumed that the occurrence area has a fan shape expanding in a predetermined horizontal angle $\theta$ about a present position c of the vehicle 10B, and this fan shape is divided into four in the radial direction, thereby defining four areas Q1 to Q4 below.

Area Q1: fan-shaped area surrounded by c→a1→b1→c
Area Q2: arc-shaped area surrounded by a1→a2→b2→b1→a1
Area Q3: arc-shaped area surrounded by a2→a3→b3→b2→a2
Area Q4: arc-shaped area surrounded by a3→a4→b4→b3→a3

In the case of the above-described selection criteria 1 and 3, the condition for the vehicle 10B to acquire provision information K1 from a node N1 is that the travel distance from the present position c to the occurrence position of the provision information K1 is within the predetermined distance L1.

Therefore, sensor information that has occurred at a position Xa in the area Q1 is provided to the vehicle 10B as the provision information K1 of the node N1.

The condition for the vehicle 10B to acquire provision information K2 from a node N2 is that the travel distance from the present position c to the occurrence position of the provision information K2 is within the predetermined distance L2.

Therefore, the sensor information that has occurred at the position Xa in the area Q1 and sensor information that has occurred at a position Xb in the area Q2 are provided to the vehicle 10B as the provision information K2 of the node N2.

The condition for the vehicle 10B to acquire provision information K3 from a node N3 is that the travel distance from the present position c to the occurrence position of the provision information K3 is within the predetermined distance L3.

Therefore, the sensor information that has occurred at the position Xa in the area Q1, the sensor information that has occurred at the position Xb in the area Q2, and sensor information that has occurred at a position Xc in the area Q3 are provided to the vehicle 10B as the provision information K3 of the node N3.

The condition for the vehicle 10B to acquire provision information K4 from a node N4 is that the travel distance from the present position c to the occurrence position of the provision information K4 is within the predetermined distance L4.

Therefore, the sensor information that has occurred at the position Xa in the area Q1, the sensor information that has occurred at the position Xb in the area Q2, the sensor information that has occurred at the position Xc in the area Q3, and sensor information that has occurred at a position X4 in the area Q4 are provided to the vehicle 10B as the provision information K4 of the node N4.

The above is summarized as follows.

The vehicle 10B can acquire, from the nodes N1 to N4 of the slices S1 to S4, sensor information that has occurred in the area Q1 which is close to the present position c.

The vehicle 10B can acquire, from the nodes N2 to N4 of the slices S2 to S4, sensor information that has occurred in the area Q2 which is next close to the present position c.

The vehicle 10B can acquire, from the nodes N3 to N4 of the slices S3 to S4, sensor information that has occurred in the area Q3 which is a little far from the present position c.

The vehicle 10B can acquire, from the node N4 of the slice S4, sensor information that has occurred in the area Q4 which is still farther from the present position c.

In this manner, the vehicle 10B can acquire the same sensor information that has occurred at the position Xa in the area Q1, from a plurality of the nodes N1 to N4, for example. Similarly, the vehicle 10B can acquire the same sensor information that has occurred at Xb in the area Q2, from a plurality of the nodes N2 to N4.

Therefore, when the vehicle 10B has received the same sensor information from different transmitting bodies, it is preferable that the vehicle 10B determines whether or not adoption of the sensor information is allowed, in accordance with predetermined priorities.

For example, the level of priority can be defined as follows. In a case of the priority levels 1 to 4 below, when the vehicle 10B has acquired sensor information having the same occurrence position, the vehicle 10B preferentially acquires sensor information from the node N1 to N4 that has a smaller transmission delay time period D1 to D4.

Priority level 1: node N1 (slice S1)
Priority level 2: node N2 (slice S2)
Priority level 3: node N3 (slice S3)
Priority level 4: node N4 (slice S4)

Selection criteria may be set such that the areas Q1 to Q4 are in one-to-one correspondence with provision information K1 to K4. The selection criteria in this case are as follows, for example.

When 0<X<L1: the node N1 provides provision information K1 to the vehicle 10B.

When L1≤X<L2: the node N2 provides provision information K2 to the vehicle 10B.

When L2≤X<L3: the node N3 provides provision information K3 to the vehicle 10B.

When L3≤X<L4: the node N4 provides provision information K4 to the vehicle 10B.

The above is summarized as follows.

The vehicle 10B can acquire, from the node N1 of the slice S1, sensor information that has occurred in the area Q1 which is close to the present position c.

The vehicle 10B can acquire, from the node N2 of the slice S2, sensor information that has occurred in the area Q2 which is next close to the present position c.

The vehicle 10B can acquire, from the node N3 of the slice S3, sensor information that has occurred in the area Q3 which is a little far from the present position c.

The vehicle 10b can acquire, from the node N4 of the slice S4, sensor information that has occurred in the area Q4 which is still farther from the present position c.

The borders of the areas Q1 to Q4 may be overlapped. For example, selection criteria when the borders are overlapped by a predetermined distance with a margin±α are as follows.

0<X<L1+α: the node N1 provides provision information K1 to the vehicle 10B.

L1−α≤X<L2+α: the node N2 provides provision information K2 to the vehicle 10B.

L2−α≤X<L3+α: the node N3 provides provision information K3 to the vehicle 10B.

L3−α≤X<L4: the node N4 provides provision information K4 to the vehicle 10B.

OTHER MODIFICATIONS

The embodiment (including modifications) disclosed herein is all illustrative and not restrictive. The scope of the present disclosure is not limited to the embodiment described above, and includes all changes which come within the range of equivalency of configurations described in the claims.

In the embodiment described above, in a case where source data composed of information regarding a vehicle/pedestrian extracted from image data of a roadside sensor 12 (hereinafter, "image extraction data") is shared by nodes N1 to N4, it may be determined, with respect to pieces of image extraction data acquired via other nodes N1 to N4, whether or not adoption thereof is allowed, for their respective data forms.

For example, in a case where the image extraction data is information indicating the presence/absence of a vehicle/pedestrian (hereinafter, referred to as "presence/absence data"), the presence/absence data provided by the base station 2 and the edge server 3 is set as the target to be shared by the vehicle 10B.

That is, when the presence/absence data is provision information K2, K3 acquired from the node N2, N3, the vehicle 10B takes in the presence/absence data, and when the presence/absence data is acquired from the node N1, N4, the vehicle 10B does not take in the presence/absence data.

In a case where the image extraction data is about a group of a plurality of vehicles/pedestrians and is information that includes the presence/absence, the size, and the like of the group (hereinafter, referred to as "group data"), the group data provided by the edge server 3 and the core server 4 is set as the target to be shared by the vehicle 10B.

That is, when the group data is provision information K3, K4 acquired from the node N3, N4, the vehicle 10B takes in the group data, and when the group data is acquired from the node N1, N2, the vehicle 10B does not take in the group data.

Thus, the source data first transmitted by a node N1 serving as an information source in the network slice S1 may be data (the presence/absence data, the group data, or the like described above) processed in some way by the node N1 serving as the information source.

In this case, as described above, preferably, the vehicle 10B at the information acquiring side determines whether or not adoption of provision information K1 to K4 is allowed, on the basis of the data content of the source data (whether the source data is the presence/absence data or the group data described above, or the like).

Accordingly, the diffusion range of the source data from the occurrence position thereof can be adjusted as desired in accordance with the data content of the source data.

That is, when it is preferable that the presence/absence data is caused to be acquired by a vehicle 10B that is separate from the occurrence position of the presence/absence data by a middle distance (for example, 500 m to 1 km), the presence/absence data may be set as the information provision target by the slice S2, S3 (node N2, N3).

When it is preferable that the group data is caused to be acquired by a vehicle 10B that is separate from the occurrence position of the group data by a long distance (for example, 500 m to 2 km), the group data may be set as the information provision target by the slice S3, S4 (node N3, N4).

For example, in the embodiment described above, the server 3, 4 may be of one type. That is, the wireless communication system of the present embodiment may have a system configuration that includes either the edge server 3 or the core server 4.

In the embodiment above, the vehicle 10 may be a vehicle capable of performing: automatic driving control that assists driving operation of a person; or automatic driving control that does not require driving operation of a person.

In the embodiment described above, the present position of the target vehicle may not necessarily be a position for which strict real-timeness is required, but may be a position at a time shifted from the present moment by a time period within a predetermined time period (for example, 0.5 seconds), in accordance with characteristics of the driving support control performed by use of the provision information K1 to K4.

In the embodiment described above, the occurrence position of source data may not necessarily be a position for which strict accurateness is required, but may be a position (a position associated with the source data) in a range that can be considered substantially the same as a strict occurrence position, in accordance with characteristics of the driving support control performed by use of the provision information K1 to K4.

REFERENCE SIGNS LIST 1A communication terminal of vehicle (information providing terminal)
1B communication terminal of vehicle (information acquiring terminal)
1C communication terminal of pedestrian (information providing terminal)
1D communication terminal of roadside sensor (information providing terminal)
1E communication terminal of traffic signal controller (information providing terminal)
2 base station
3 edge server (server)
4 core server (server)
10 vehicle
10A vehicle (information providing side)
10B vehicle (information acquiring side: target vehicle)
11 pedestrian
12 roadside sensor
13 traffic signal controller
20 on-vehicle apparatus
21 on-vehicle computer
22 GPS receiver
23 vehicle speed sensor
24 gyro sensor
25 storage device
26 display
27 speaker
28 input device
29 on-vehicle camera
30 radar sensor
31 communication terminal
N1 communication node
N2 communication node
N3 communication node
N4 communication node

The invention claimed is:

1. A wireless communication system in which multiple layers of network slices with different allowable delay time periods are virtually defined, the wireless communication system comprising:
    an information providing terminal being a communication terminal belonging to a first node, the information providing terminal configured to transmit, to another station, first provision information that includes source data usable for driving support control;
    a base station belonging to a second node and configured to transmit, to another station, second provision information based on the source data;
    a server belonging to a third node and configured to transmit, to another station, third provision information based on the source data;
    an information acquiring terminal being a communication terminal belonging to the first node, the information acquiring terminal being mounted to a target vehicle to which the first to third provision information is to be provided; and
    a processor configured to determine whether or not adoption of the first to third provision information is allowed, on the basis of a position of the target vehicle and a position associated with the source data, wherein
    the first node is a communication node configured to perform terminal-to-terminal communication in a first network slice for which an allowable delay time period is a first time period,
    the second node is a communication node configured to communicate with the first node in a second network slice for which an allowable delay time period is a second time period,
    the third node is a communication node configured to communicate with the first node via the second node in a third network slice for which an allowable delay time period is a third time period, and
    the second time period is greater than the first time period, and the third time period is greater than the second time period.

2. The wireless communication system according to claim 1, wherein
    the processor is provided to the target vehicle.

3. The wireless communication system according to claim 1, wherein
    the processor is provided to at least one of: an apparatus having the information providing terminal; the base station; and the server.

4. The wireless communication system according to claim 1, wherein
the processor determines whether or not adoption of the first to third provision information is allowed, on the basis of at least one of: a distance from the position of the target vehicle to the position associated with the source data; a required time period from the position of the target vehicle to the position associated with the source data; and priorities of the first to third provision information.

5. The wireless communication system according to claim 1, wherein
the processor determines whether or not adoption of the first to third provision information is allowed, on the basis of at least one of a vehicle speed, a heading direction, and a travel route of the target vehicle.

6. The wireless communication system according to claim 1, wherein
the processor determines whether or not adoption of the first to third provision information is allowed, on the basis of a data content of the source data.

7. The wireless communication system according to claim 1, further comprising
another server belonging to a fourth node and configured to transmit, to another station, fourth provision information based on the source data, wherein
the determination unit determines whether or not adoption of the first to fourth provision information is allowed, on the basis of the position of the target vehicle and the position associated with the source data, wherein
the fourth node is a communication node configured to communicate with the first node via the third node and the second node or via the second node in a fourth network slice for which an allowable delay time period is a fourth time period being greater than the third time period.

8. An information acquiring terminal included in the wireless communication system according to claim 1, the information acquiring terminal comprising
a processor configured to determine whether or not adoption of the first to third provision information is allowed, on the basis of a position of the information acquiring terminal and the position associated with the source data.

9. A server included in the wireless communication system according to claim 1, the server comprising
a processor configured to determine whether or not adoption of the third provision information is allowed, on the basis of the position of the information acquiring terminal and the position associated with the source data.

10. The wireless communication system according to claim 1, wherein the determination of whether or not adoption of the first to third provision information being allowed is a determination of whether or not to allow the information acquiring terminal to take in the first to third provision information, or a determination of whether or not to allow the information providing terminal, the base station or the server to transmit the first to third provision information.

11. A non-transitory computer readable storage medium storing a computer program configured to cause a computer to function as a communication node of a wireless communication system in which multiple layers of network slices with different allowable delay time periods are virtually defined,
the wireless communication system including:
an information providing terminal being a communication terminal belonging to a first node, the information providing terminal configured to transmit, to another station, first provision information that includes source data usable for driving support control;
a base station belonging to a second node and configured to transmit, to another station, second provision information based on the source data;
a server belonging to a third node and configured to transmit, to another station, third provision information based on the source data; and
an information acquiring terminal being a communication terminal belonging to the first node, the information acquiring terminal being mounted to a target vehicle to which the first to third provision information is to be provided,
the computer program causing the computer to function as a processor configured to determine whether or not adoption of the first to third provision information is allowed, on the basis of a position of the target vehicle and a position associated with the source data, wherein
the first node is a communication node configured to perform terminal-to-terminal communication in a first network slice for which an allowable delay time period is a first time period,
the second node is a communication node configured to communicate with the first node in a second network slice for which an allowable delay time period is a second time period,
the third node is a communication node configured to communicate with the first node via the second node in a third network slice for which an allowable delay time period is a third time period, and
the second time period is greater than the first time period, and the third time period is greater than the second time period.

12. A method for determining whether or not adoption of provision information is allowed, the method being performed in a wireless communication system in which multiple layers of network slices with different allowable delay time periods are virtually defined,
the wireless communication system including:
an information providing terminal being a communication terminal belonging to a first node, the information providing terminal configured to transmit, to another station, first provision information that includes source data usable for driving support control;
a base station belonging to a second node and configured to transmit, to another station, second provision information based on the source data;
a server belonging to a third node and configured to transmit, to another station, third provision information based on the source data; and
an information acquiring terminal being a communication terminal belonging to
the first node, the information acquiring terminal being mounted to a target vehicle to which the first to third provision information is to be provided,
the method comprising
a step of determining whether or not adoption of the first to third provision information is allowed, on the basis of a position of the target vehicle and a position associated with the source data, wherein the first node is a communication node configured to perform terminal-to-terminal communication in a first network slice for which an allowable delay time period is a first time period, the second node is a communication node configured to communicate with the first node in a second network slice for which an allowable delay time period is a second time period, the third node is a communication node configured to communicate with the first node via the second node in a third network slice for which an allowable delay time period is a third time period, and the second time period is greater than the first time period, and the third time period is greater than the second time period.

* * * * *